United States Patent [19]

Grant

[11] Patent Number: 4,757,962
[45] Date of Patent: Jul. 19, 1988

[54] AMPHIBIOUS VEHICLE

[76] Inventor: Terrence Grant, P.O. Box F-4281, Freeport, Grand Bahama, The Bahamas

[21] Appl. No.: 36,761

[22] Filed: Apr. 9, 1987

[51] Int. Cl.[4] .............................................. B64C 29/04
[52] U.S. Cl. .............................. 244/12.3; 244/100 A; 244/23 B; 180/116
[58] Field of Search .................... 244/12.1, 12.3, 23 R, 244/23 B, 23 C, 13, 100 A, 36, 45 R, 45 A; 180/116, 117, 121

[56] References Cited

U.S. PATENT DOCUMENTS

| 2,118,254 | 5/1938 | Loedding | 244/36 |
| 3,174,573 | 3/1965 | Chaplin | 244/23 R |
| 3,931,942 | 1/1976 | Alpert | 244/12.1 |
| 3,981,462 | 4/1976 | Berezhnoi et al. | 244/100 A |
| 4,469,294 | 9/1984 | Cliffton | 244/12.3 |

FOREIGN PATENT DOCUMENTS 1223702 8/1966 Fed. Rep. of Germany .... 244/23 R

OTHER PUBLICATIONS

Papandreadis, "Helicoplane", European Patent Office Publication 0120263, Oct. 3, 1984.

Primary Examiner—Galen Barefoot
Attorney, Agent, or Firm—Millen & White

[57] ABSTRACT

An amphibious vehicle comprises a fuselage having a pair of support pods at the front end thereof and a single support pod at the rear. In accordance with one embodiment of the invention, each pod has a fan therein and in accordance with another embodiment, the pods serve as floats. The vehicle has a top wing adjacent the rear thereof and a bottom wing adjacent the front, each of which have elevator surfaces thereon. Port and starboard engines are positioned adjacent the rear of the vehicle.

11 Claims, 6 Drawing Sheets 4,757,962

AMPHIBIOUS VEHICLE

BACKGROUND OF THE INVENTION

There is a need for a safe, stable vehicle for transporting passengers and cargo rapidly in areas which are generally accessible only by boats or perhaps by helicopters at very great expense. Many maritime areas, such as, for example, the Caribbean, need vehicles which can provide swift transportation, yet require minimal docking and service facilities at accessed locations. Airports are frequently expensive to safely and adequately maintain and necessarily require a network of connecting roads to be useful. Accordingly, the instant invention provides a new and improved vehicle for meeting these needs.

The prior art includes a number of devices such as ground effect machines and air-supported vehicles. Such devices are exemplified by U.S. Pats. Nos. 3,170,530; 2,209,848; 3,174,573; and 3,611,980. However, these devices carry relatively light loads and are not suitable for mass transport of cargo and passengers. Larger vehicles of this type are exemplified by the machines of U.S. Pat. No. 3,547,397 and U.S. Pat. No. 3,917,022. However, each of these machines has a power source for vertical support which is centrally located within the vehicle, as opposed to being distributed adjacent the periphery of the fuselage of the vehicle.

SUMMARY OF THE INVENTION

In view of the aforementioned considerations, it is an object of the instant invention to provide a new and improved amphibious vehicle which has a basic configuration allowing the vehicle to function as an airborne vehicle, a ground effect machine and an amphibious, low-altitude airborne vehicle particularly suitable for transportation over water.

The instant invention contemplates a vehicle for transportation wherein the vehicle comprises a fuselage for carrying a load transported by the vehicle. The fuselage has a front portion, a rear portion, first and second similarly configured lateral portions, a top surface and a bottom surface. A first strut means extends downwardly and outwardly from the rear portion of the fuselage and a pair of second struts extends downwardly and outwardly from the lateral portions of the fuselage adjacent the front end of the fuselage. Circular vehicle support pods are positioned beneath each strut. Each vehicle support pod has upper and lower sides, with means acting from the lower sides to cushion the vehicle with respect to the ground and propulsion means extend laterally of the fuselage for generating thrust to propel the vehicle. A first horizontal stabilizer is disposed in spaced relation to the underside of the fuselage adjacent the front end of the vehicle, and a second horizontal stabilizer is disposed above the fuselage adjacent the rear end of the fuselage.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DESCRIPTION OF THE PREFERRED EMBODIMENTS

Figure 6:
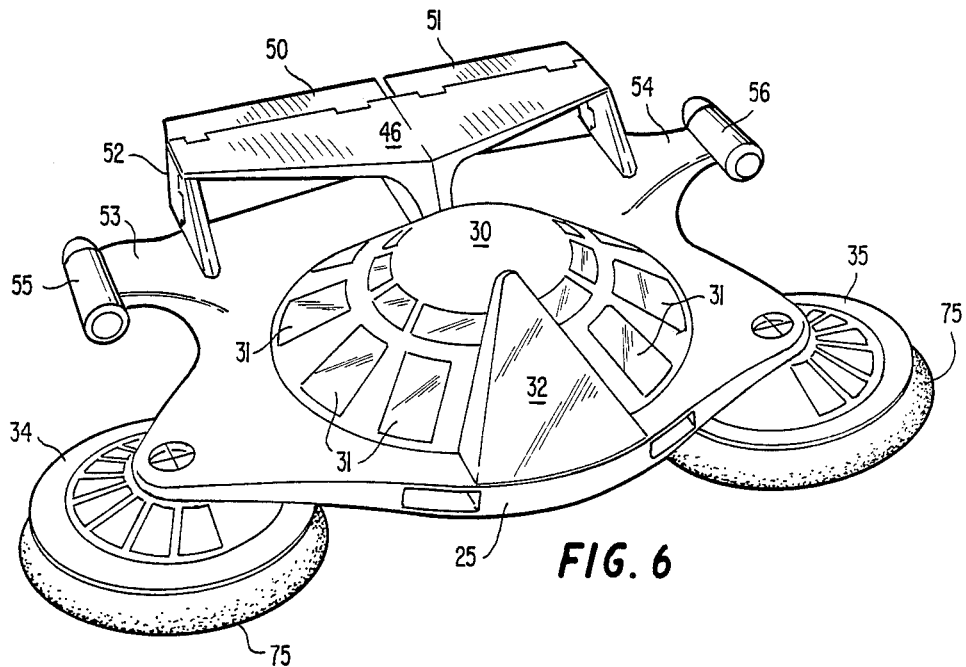
FIG. 6 is a top perspective view of another embodiment of the instant invention showing utilization of ducted fans.
Figure 7:
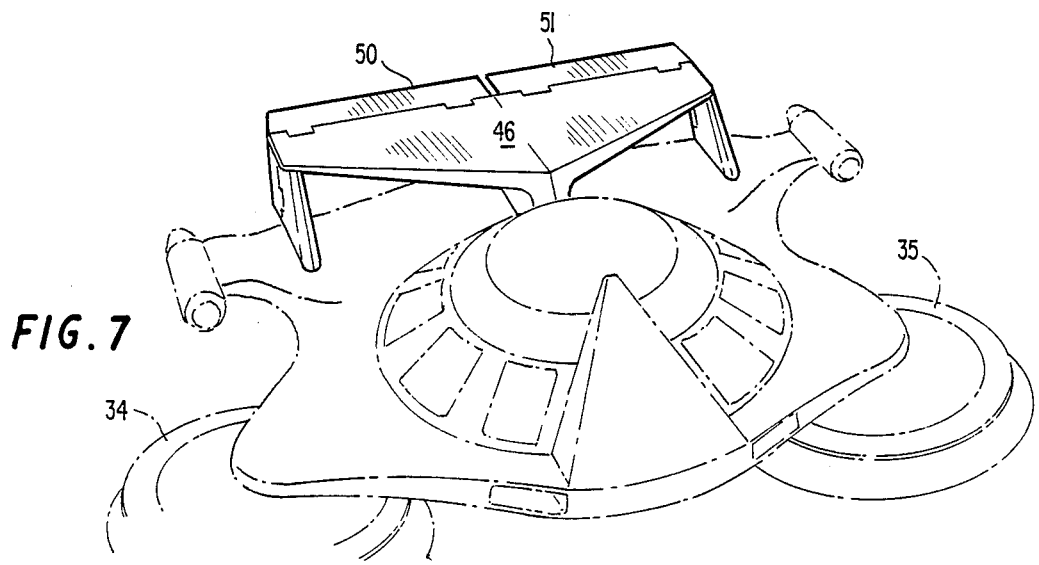
FIG. 7 is a top perspective view of another embodiment of the instant invention showing utilization of floats, as opposed to ducted fans.

FIGS. 1–7 of the drawings are illustrative of the basic configuration of a vehicle, designated generally by the numeral 20, configured in accordance with the principles of the instant invention. FIGS. 1–5 are directed to an embodiment which is used as either an aircraft or ground effect machine, whereas the embodiment shown in FIGS. 6 and 7 is equipped with floats so as to be used as a waterborne machine which is capable of low flight over water. The embodiment of FIG. 6 may also function as a ground effect machine over land.

Referring now specifically to the embodiment of FIGS. 1–5, it is seen that the vehicle 20 comprises a fuselage, generally designated by the numeral 21 having a top surface 22 (see FIGS. 1 and 2), bottom surface 23 (see FIG. 4) and leading and trailing ends 25 and 26, respectively. The top surface of the fuselage 22 also includes a dome-shaped compartment 29 in which the crew, passengers and/or cargo are contained. The surface 29 tapers from a crown portion 30 to define sides with a plurality of windows 31 therein and a front windshield 32 behind which the crew sits. The fuselage has lateral sections 33 which extend laterally from the dome-shaped portion 29 and serve as air foil lift surfaces, as well as struts for a pair of lift pods 34 and 35. A third lift pod 36 is disposed adjacent the trailing end 26 of the fuselage 29. The lift pods 34 and 35 are relatively far forward with respect to the length of the fuselage 21 so as to form a stable triangular support system for the vehicle 20. In accordance with one embodiment of the invention, and as will be explained in more detail hereinafter, each of the lift pods 34, 35 and 36 contains an engine-driven fan for generating vertical thrust which is used to operate the vehicle 20 as a ground effect machine or to vertically lift the vehicle when the vehicle is used as an airplane.

The bottom surface 23 of the fuselage 21 and of the lateral portions of the fuselage is substantially flat so as to combine with the curved upper surfaces of the fuselage 22 and lateral portions 33 to provide a lifting air foil which lifts the vehicle 20 when sufficient forward velocity is provided. In addition, the underside 23 has a wing 40 supported adjacent thereby by a strut 41 with the ends thereof being supported by the lift pods 34 and 35. The wing 40 has a pair of flaps 43 and 44 extending from the rear surface thereof which may be used for control as well as lift generating purposes. In order to generate increased lift during low-speed flight, the flaps 43 and 44 may both be lowered or, in the alternative, in order to either control or generate roll during turns of the vehicle 20 while airborne, either one of the flaps may be lowered while the other remains raised.

Positioned in space relation above the fuselage 22 is a second wing 46 mounted on a streamlined strut 47 and a pair of vertical stabilizers 48. The wing 46 has a pair of elevators 50 and 51 which control the attitude and roll of the vehicle 20 when the vehicle is airborne and making a turn. The vertical stabilizers 48 each have a rudder 52 extending from the rear edges thereof which cooperates with the elevators 50 and 51 in steering the vehicle 20 when the vehicle is flying.

Laterally projecting outboard of the vertical stabilizers 48 are a pair of gull-wing struts 53 and 54 supporting at the outboard ends thereof engine pods 55 and 56. The gull-wing struts 53 and 54 add to the lift of the vehicle as well as serving as supports for the engine pods 55 and 56. The engine pods 55 and 56 may contain either gas turbine engines 58 and 59 for driving pusher propellers 61, which is the preferred embodiment, or may utilize jet engines (not shown). By mounting the engines generally laterally of the vehicle 20, the inventor is better able to control yaw of the vehicle.

Figure 1:
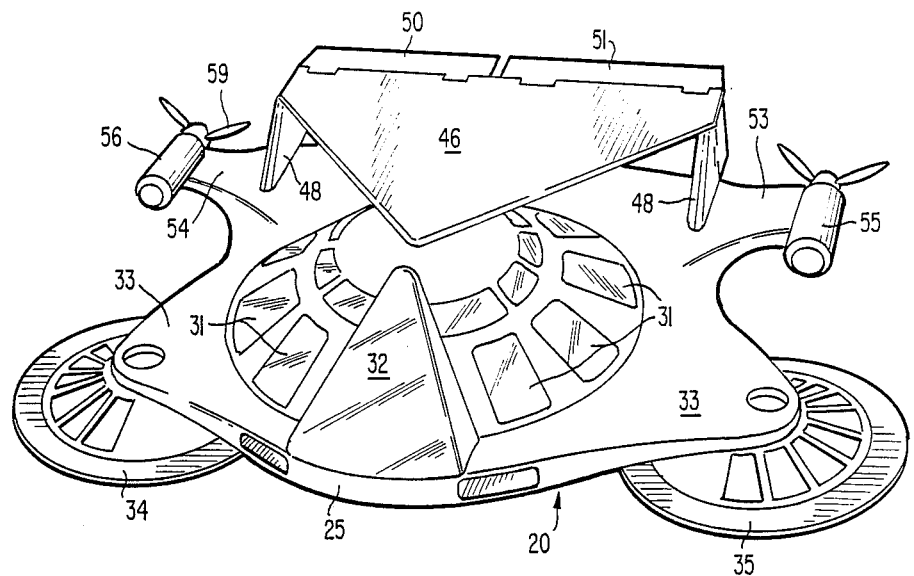
FIG. 1 is a top perspective view of one embodiment of the amphibious vehicle in accordance with the instant invention.
Figure 2:
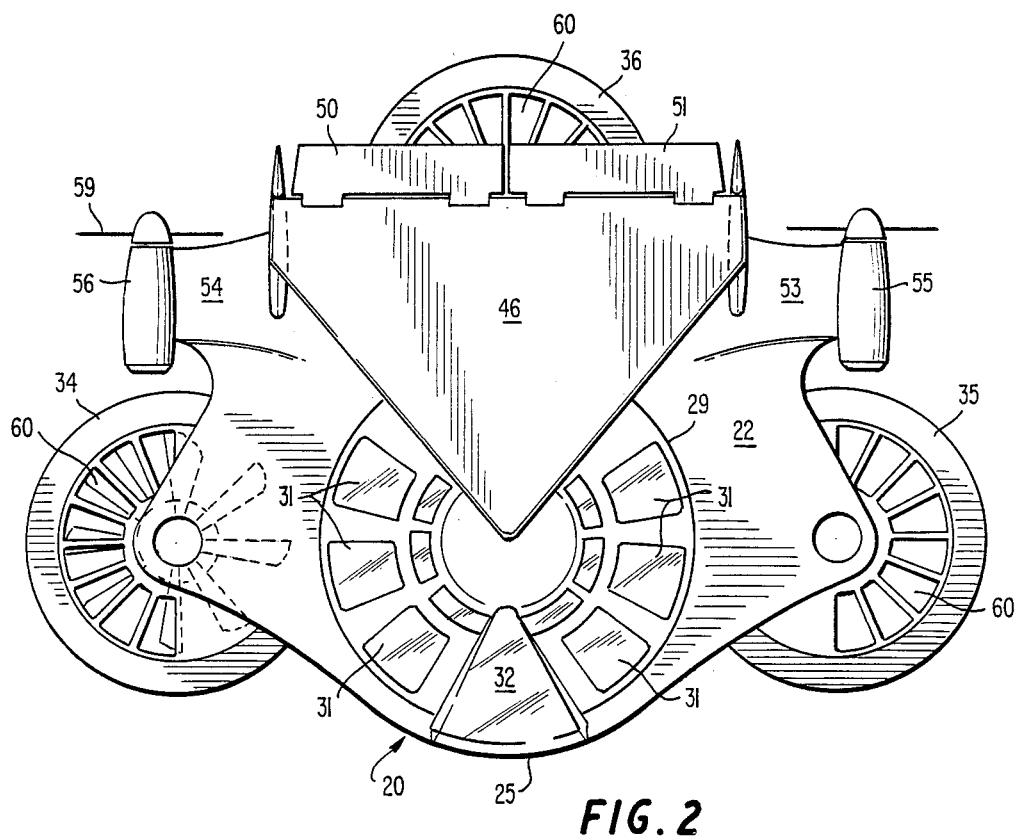
FIG. 2 is a top view of the amphibious vehicle shown in FIG. 1.
Figure 3:
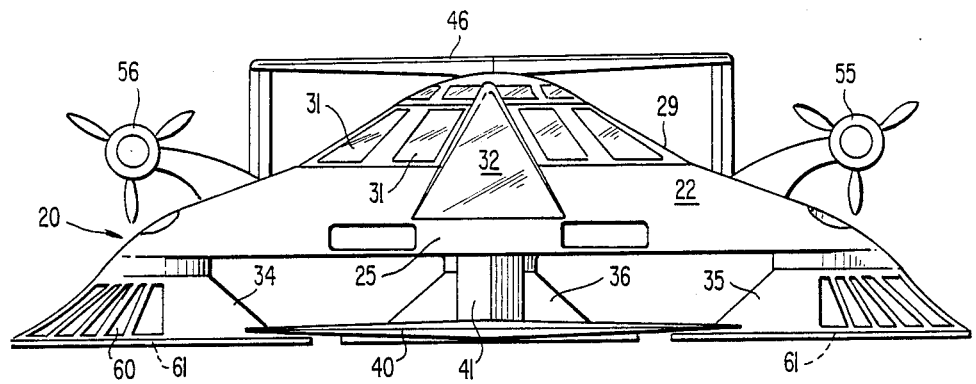
FIG. 3 is a front view of the amphibious vehicle shown in FIG. 1.
Figure 4:
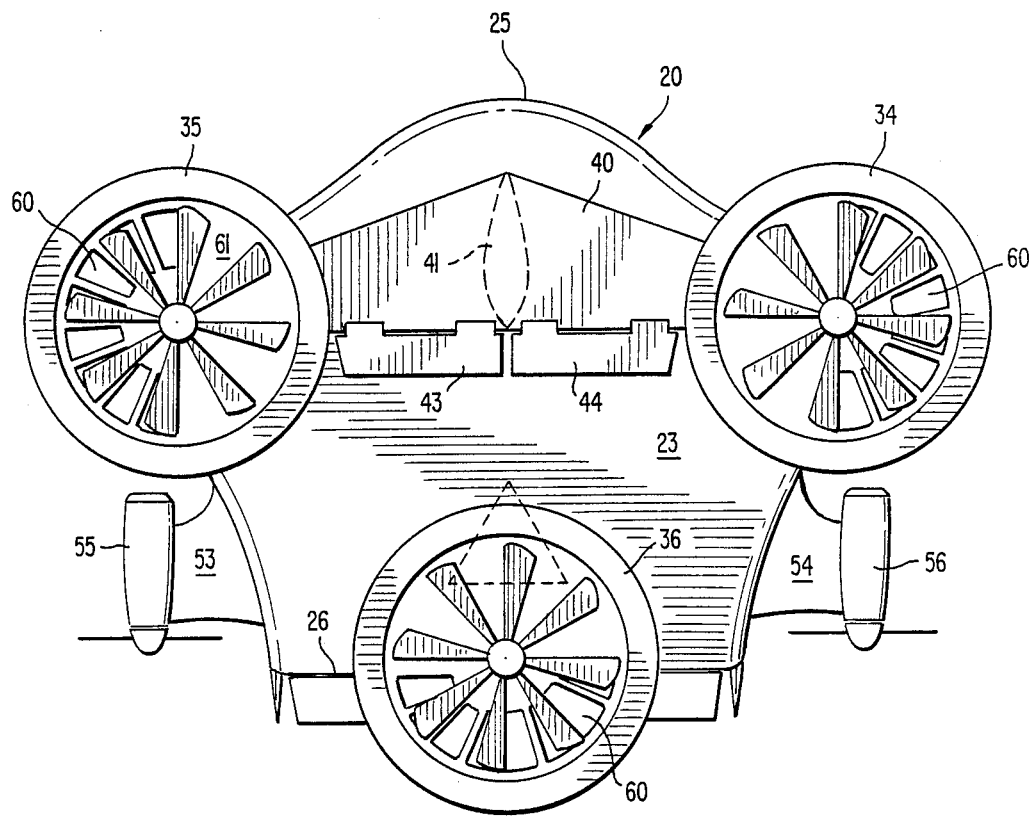
FIG. 4 is a bottom view of the amphibious vehicle shown in FIG. 1.
Figure 5:
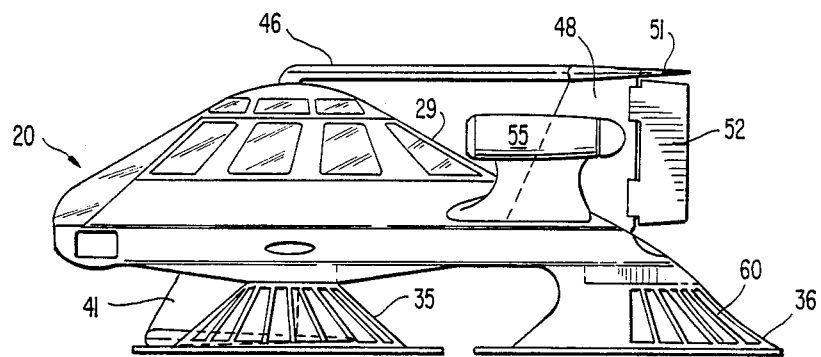
FIG. 5 is a side view of the amphibious vehicle shown in FIG. 1.
Figure 8:
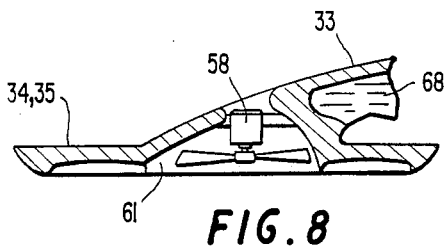
FIG. 8 is a side sectional view of one of the lifting pods in accordance with the first embodiment of the invention.
Figure 9:
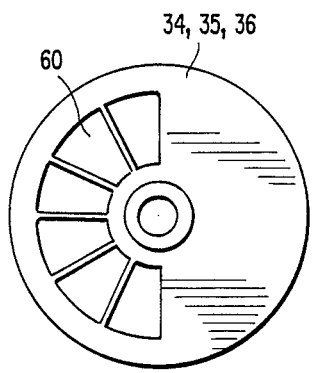
FIG. 9 is a top view of the lifting pod of FIG. 8.

In its configuration as a flying craft, each of the pods 34, 35 and 36 contains a very high-powered, lightweight engine with fan blades or a prop for vertical take-off and landing located in each lift pod. Preferably, each lift pod 34, 35 and 36 also includes an inflatable bladder which allows water landings and provides for flotation of the vehicle 20. As is seen in FIG. 3 and in FIG. 5, each of the lift pods has a series of top air inlets 60 which allow the engines 58 to pull air through the top of the pod and expel the air in a vertical column through the bottom of the pod 61. As is shown in FIG. 8, which shows a cross-section of a pod and a lateral wing portion 33 of the fuselage, there is a hollow portion 68 in which fuel is stored.

In accordance with the preferred embodiment of the invention, each of the lift pods 34, 35 and 36 includes a secondary disk 80 which houses vertical flaps. The secondary disk is able to rotate through 360 degrees both in the clockwise and counterclockwise directions and may be operated by hydraulic or electric motors. This system allows one to maneuver the vehicle 20 to the left or right while in flight and facilitates landing of the vehicle.

Figure 12:
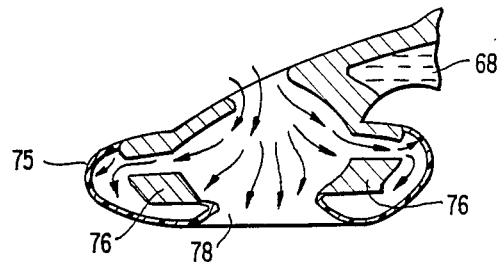
FIG. 12 is a side sectional view of the skirt of FIG. 10.
Figure 10:
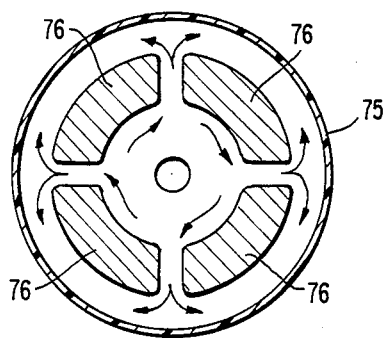
FIG. 10 is a bottom view of a ground effect skirt according to the instant invention.
Figure 11:
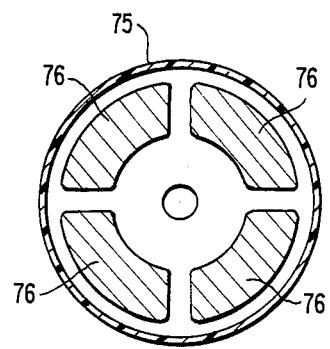
FIG. 11 is a top view of the skirt of FIG. 10.

In a second embodiment of the vehicle, the vehicle is configured as a hovercraft, as is shown in FIG. 6 wherein there are skirts designated generally by the numeral 75 disposed about the periphery of each of the lift pods 34, 35 and 36. In the embodiment of FIG. 6, the vehicle 20 functions as a ground effect machine suitable for flight over land as well as low flight over water which has essentially the same configuration as the aircraft illustrated in FIGS. 1-5. Referring now more specifically to FIGS. 10, 11 and 12 wherein various aspects of the ground effect pod are shown, it is seen that within each pod there are a plurality of baffles 76 which distribute the air taken in through inlet 60 adjacent the inner periphery of the skirt 75 and through a central channel 78 in order to support the vehicle 20.

Figure 13:
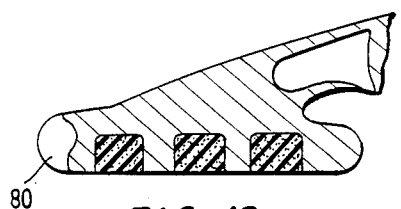
FIG. 13 is a side sectional view of a float utilized with the embodiment of FIG. 6.
Figure 14:
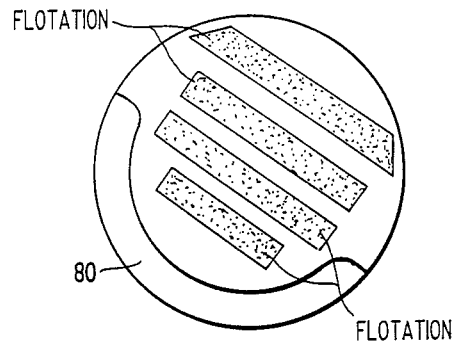
FIG. 14 is a bottom view of the float shown in FIG. 13.

Referring now to FIGS. 7, 13 and 14 wherein a third embodiment of the invention is disclosed, it is seen that each of the lift pods 34, 35 and 36 is in the form of a styrofoam filled or floatation bars which serves essentially as a pontoon for an amphibious vehicle which is driven by air props. Each of the foam filled floats includes a bumper portion made of a bladder 80 which may be distributed completely around the periphery of the lift pod or disposed only about a portion of the periphery.

In accordance with a preferred arrangement of the vehicle 20, each of the embodiments includes emergency water propulsion means in the form of a retractable propeller 90 which is mounted in and lowered from the strut 41 which supports lower wing 40. The propeller 90 may be powered by a hydraulic motor which is driven by power from any of the engines used to either lift the craft via lift pods 34, 35 and 36 or the horizontal thrust engines 55 or 56. In an optional arrangement, the propeller 90 may be driven by an auxiliary engine mounted in the strut 41.

Figure 15:
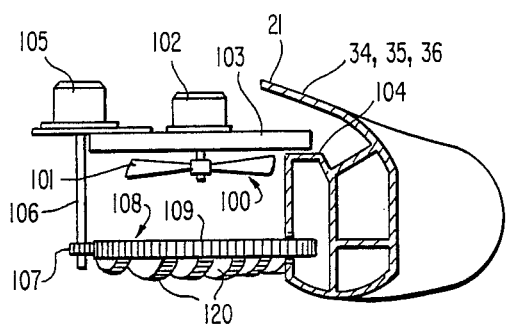
FIG. 15 is a side view, in cross-section, showing a louver control system.
Figure 17:
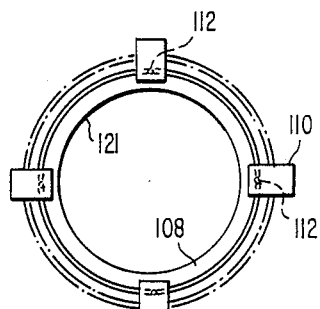
FIG. 17 is a bottom view showing how a ring-forming part of the louver control system of FIG. 15 works.
Figure 16:
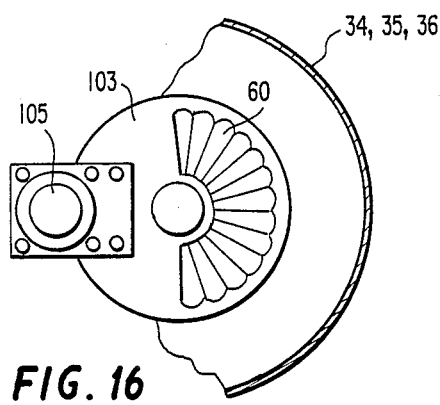
FIG. 16 is a top view of the louver control system of FIG. 15.
Figure 18:
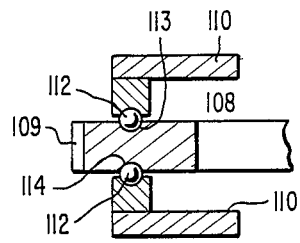
FIG. 18 is an enlarged detail of the support system of FIG. 17.
Figure 19:
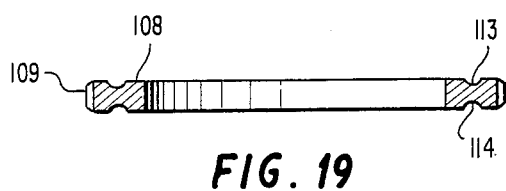
FIG. 19 is a side sectional view of the ring shown in FIG. 17.

Referring now to FIGS. 15-21, there is shown a preferred configuration for the ducted fan lifting arrangement for vehicles such as those of FIGS. 1-6. As is seen in FIG. 15, each of the pods 34, 35 and 36 of the vehicle have a fan designated generally by the numeral 100 which each include a plurality of fan blades 101. The fans 100 are driven by an engine 102 which may be an aircraft-type piston engine and is preferably a gas turbine engine. The engine 102 is mounted on a support 103 which is secured to the fuselage 21 by a support bracket 104. Also mounted on the support 103 is an electric motor 105 which has an elongated drive shaft 106 having a pinion 107 thereon for turning a louver ring designated generally by the numeral 108 which ring has gear teeth 109 around its periphery, As will be explained hereinafter, the louver ring 108 has a plurality of louvers therein which control the direction of thrust by the fan blades 101. Referring now to FIG. 16, the arrangement for mounting the louver ring 108 is shown wherein the louver ring is supported in the vertical direction by bearings 112 which are attached to struts 110 extending from the fuselage and from the upper bracket 104 which mounts the support 103. The bearings 112 ride in upper and lower grooves 113 and 114 in the ring 108. The ring 108 is stabilized in the horizontal direction by three pionions located 60 degrees apart and journaled on supports fixed to the fuselage 21.

Figure 20:
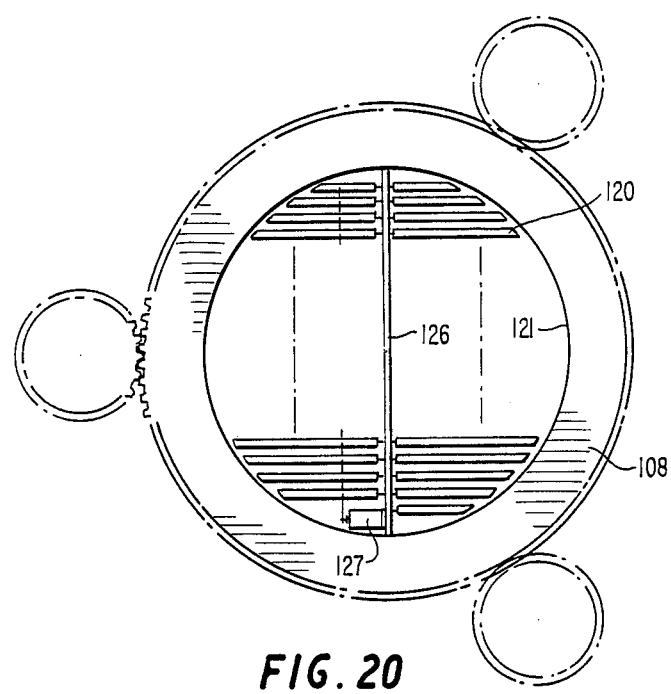
FIG. 20 is a bottom view of the louver control system of FIG. 15.
Figure 21:
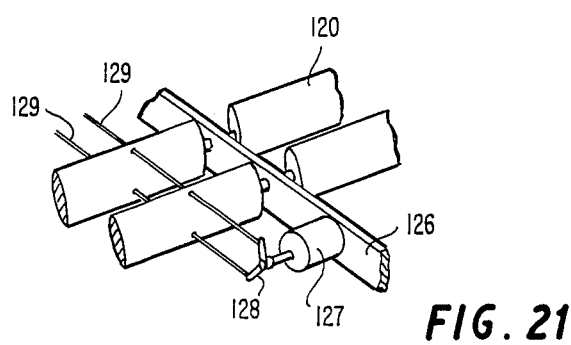
FIG. 21 is a perspective view of a portion of the louver control system.

As seen in FIG. 20, the louver ring 108 has an open central area which includes a plurality of louvers 120 each of which is pivoted at opposite ends in bearings disposed around the inner periphery 121 of the louver ring 108 so as to pivot about horizontal axis. The louver ring 108 is bisected by a strut 126 which is fixed at opposite ends to the inner periphery 121 and in which each of the louvers 120 is journaled by a portion of the louvers which is circular in cross-section. Mounted on the strut 126 is an electric motor 127 which has a crank 128 thereon. Attached to the crank 128 are upper and lower rods or cables 129, each of which is pivotally attached to each louver 120 at a fixed point so that the angle of the louvers can be controlled by rotating the crank 128 with the electric motor 127 in either the clockwise or counterclockwise direction. The electrical power for the motor 127 may be delivered by electrical contact surfaces on the ring which are connected to stationary contacts on the fuselage whereby as the ring rotates, the stationary contacts stay in electrical connection with the circular rails.

While the vehicle 20 is operating as an aircraft or hovercraft, the attitude, pitch and yaw of the vehicle is controlled by deflecting the air stream from the fan 100 with respect to the access about which the fan rotates by operating the louvers 120 with the motor 127. Simultaneously, the direction of the air stream with respect to the vertical axis of the vehicle 20 as a whole by rotating louver ring 108 with the motor 105. Generally, the louvers 120 remain closed when the vehicle 20 is cruising at high speed and are opened when the vehicle slows down to land in order to control vertical motion of the vehicle by providing vertical thrust. The louvers may also be used to control direction of flight pitch and yaw as the vehicle flyes.

From the foregoing description, one skilled in the art can easily ascertain the essential characteristics of the invention and, without departing from the spirit and scope thereof, can make various changes and modifications of the invention to adapt it to various usages and conditions.

What is claimed is:

1. A vehicle for transportation, the vehicle comprising:

a fuselage for carrying a load transported by the vehicle, the fuselage having a front portion, a rear portion, first and second similarly configured lateral portions, a top surface and a bottom surface;

first strut means extending downwardly and outwardly from the rear portion of the fuselage;

a pair of second strut means extending downwardly and outwardly from the lateral portions of the fuselage adjacent the front end of the fuselage;

circular vehicle support pods positioned beneath each strut, each vehicle support pod having upper and lower sides, with means acting from the lower sides to cushion the vehicle with respect to the ground;

means extending laterally of the fuselage for generating horizontal thrust to propel the vehicle;

first horizontal stabilizing means disposed in spaced relation to the underside of the fuselage adjacent the front end of the vehicle; and second horizontal stabilizing means disposed above the fuselage adjacent the rear end of the fuselage.

2. The vehicle of claim 1, wherein each circular vehicle support pod includes a ducted fan having an exhaust through the underside of the circular vehicular support pod and an intake through the top side of the circular vehicle support pod.

3. The vehicle of claim 1 wherein each circular vehicle support pod includes a hollow chamber having a flat lower surface, the hollow chambers being attached to the circular vehicular support pod.

4. The vehicle of claim 3 wherein each hollow chamber is inflatable.

5. The vehicle of claim 1 wherein the horizontal thrust generating means for moving the vehicle are mounted on struts extending laterally with respect to the fuselage and positioned above and to the rear of the pair of second vehicle support members.

6. The vehicle of claim 1 wherein the underside of the fuselage is flat and the upper side of the fuselage is in the form of a conical dome, the conical dome having sealed viewing ports distributed thereover.

7. The vehicle of claim 1 wherein the means for generating horizontal thrust are jet engines.

8. The vehicle of claim 1 wherein the means for generating horizontal thrust are prop engines.

9. The vehicle of claim 1 wherein the elevator means are attached to horizontally disposed air foils, the horizontally disposed air foils being supported by vertical stabilizers having rubber means depending therefrom.

10. The vehicle of claim 1 wherein the strut means are hollow for carrying fuel therein.

11. The vehicle of claim 1, wherein the means extending laterally of the fuselage for generating horizontal thrust comprises a pair of struts each having a gull-wing configuration and outboard ends, the struts extending laterally of the fuselage with engine pods containing motor means generating the horizontal thrust positioned at the outboard ends of the struts.

* * * * *